United States Patent
Dilshan (10) Patent No.: US 9,915,233 B2
(45) Date of Patent: Mar. 13, 2018

(54) INTERNAL COMBUSTION ENGINE WITH SUPERCHARGER

(71) Applicant: Fernando Dilshan, Toyota (JP)

(72) Inventor: Fernando Dilshan, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 205 days.

(21) Appl. No.: 14/760,891

(22) PCT Filed: Jan. 16, 2013

(86) PCT No.: PCT/JP2013/050667
§ 371 (c)(1),
(2) Date: Jul. 14, 2015

(87) PCT Pub. No.: WO2014/112052
PCT Pub. Date: Jul. 24, 2014

(65) Prior Publication Data
US 2015/0354511 A1  Dec. 10, 2015

(51) Int. Cl.
*F02M 35/10* (2006.01)
*F02M 25/08* (2006.01)
*F02B 33/40* (2006.01)

(52) U.S. Cl.
CPC ....... *F02M 35/10288* (2013.01); *F02B 33/40* (2013.01); *F02M 25/0872* (2013.01);
(Continued)

(58) Field of Classification Search
CPC ............... F02M 25/08; F02M 25/0836; F02M 25/0872; F02M 25/089; F02M 35/10157;
(Continued)

(56) References Cited

U.S. PATENT DOCUMENTS

| 4,530,210 A | * | 7/1985 | Yamazaki | F02B 33/44 |
| | | | | 123/520 |
| 5,005,553 A | * | 4/1991 | Washizu | F01M 13/023 |
| | | | | 123/572 |

(Continued)

FOREIGN PATENT DOCUMENTS

| JP | 56 163745 | 12/1981 |
| JP | 63 200655 | 12/1988 |

(Continued)

OTHER PUBLICATIONS

"Silicone Large Air INtake Pipe Impreza STI & WRX", May 19 2006, AVO turboworld, http://www.avoturboworld.com/avoshop/product_info.php?cPath=1_22_30_90&products_id=144 (Retrieved from web.archive.org).*

(Continued)

*Primary Examiner* — Hai Huynh
*Assistant Examiner* — Robert Werner
(74) *Attorney, Agent, or Firm* — Oblon, McClelland, Maier & Neustadt, L.L.P.

(57) ABSTRACT

The compressor of a forced induction device is provided in the intake passage of an internal combustion engine. An introduction passage for introducing purge gas into the intake passage is connected to the intake passage. A bent portion is provided at a position of the intake passage that is upstream of the compressor. The curvature of the bent portion in the direction in which the intake passage extends is greater than the curvatures of the portions of the intake passage that are located upstream and downstream of the bent portion. The introduction passage is connected to a part of the bent portion that is on the inner side of the bending direction.

11 Claims, 5 Drawing Sheets

(52) U.S. Cl.
CPC ..... *F02M 35/10222* (2013.01); *F02M 25/089* (2013.01); *F02M 25/0854* (2013.01)

(58) Field of Classification Search
CPC ........ F02M 35/10209; F02M 35/10222; F02D 41/003; F02D 35/10288; F02D 25/06; F02D 25/08–25/089
USPC ........................ 123/518–520, 184.21–184.61
See application file for complete search history.

(56) References Cited

U.S. PATENT DOCUMENTS

| | | | | |
|---|---|---|---|---|
| 7,556,009 | B2* | 7/2009 | Niakan | F02B 27/00 123/184.21 |
| 7,597,088 | B2* | 10/2009 | Tally | F02B 29/0475 123/559.1 |
| 8,459,225 | B2* | 6/2013 | Marimbordes | F02M 35/10255 123/184.53 |
| 8,555,637 | B2* | 10/2013 | Nakae | F17D 1/08 123/559.1 |
| 2008/0314351 | A1* | 12/2008 | Ryrholm | F01M 13/022 123/184.47 |
| 2010/0218749 | A1* | 9/2010 | Fornara | F02M 25/0836 123/520 |
| 2011/0146631 | A1 | 6/2011 | Konohara et al. | |

FOREIGN PATENT DOCUMENTS

| | | |
|---|---|---|
| JP | 2003 201927 | 7/2003 |
| JP | 2008 544142 | 12/2008 |
| JP | 2009 180095 | 8/2009 |
| JP | 2009 281317 | 12/2009 |
| JP | 2011 47358 | 3/2011 |
| JP | 2011 132839 | 7/2011 |

OTHER PUBLICATIONS

International Search Report dated Apr. 9, 2013 in PCT/JP2013/050667 filed Jan. 16, 2013.
Partial English Translation of Written Opinion dated Apr. 9, 2013 in PCT/JP2013/050667 filed Jan. 16, 2013.

* cited by examiner

INTERNAL COMBUSTION ENGINE WITH SUPERCHARGER

TECHNICAL FIELD

The present invention relates to an internal combustion engine with a forced induction device configured to introduce external gas such as purge gas to the interior of the intake passage.

BACKGROUND ART

An internal combustion engine with a forced induction device has been proposed that has an intake passage to which a fuel tank is coupled via an ejector (for example, refer to Patent Document 1). Such an internal combustion engine introduces gas (purge gas) including fuel vapor generated in the fuel tank to the intake passage via the ejector and processes the gas during forced induction, at which the internal pressure of the intake passage is increased.

Publications of the conventional technique that relate to the present invention include the following Patent Documents 2 and 3 in addition to Patent Document 1.

PRIOR ART DOCUMENTS

Patent Documents

Patent Document 1: Japanese Laid-Open Patent Publication No. 2009-180095
Patent Document 2: Japanese Laid-Open Patent Publication No. 2003-201927
Patent Document 3: Japanese Laid-Open Patent Publication No. 2011-132839

SUMMARY OF THE INVENTION

Problems that the Invention is to Solve

As in Patent Document 1, the ejector provided in the internal combustion engine including the forced induction device allows purge gas to be introduced to the intake passage. Such an internal combustion engine, however, has a complicated structure because of the ejector and causes various inconveniences such as poor mountability due to increased restriction in the mounting space.

Such a condition is not limited to internal combustion engines that introduce purge gas to the interior, but is common among internal combustion engines that introduce external gas from the outside of the intake passage to the inside of the intake passage such as those that introduce blow-by gas in the crank case.

Accordingly, it is an objective of the present invention to provide an internal combustion engine with a forced induction device that has a simple structure and introduces external gas into the intake passage during forced induction.

Means for Solving the Problems

To achieve the foregoing objective and in accordance with one aspect of the present invention, an internal combustion engine with a forced induction device is provided that includes a forced induction device and an introduction passage. The forced induction device includes a compressor arranged in an intake passage. The compressor includes a compressor wheel arranged inside the compressor. The introduction passage is connected to the intake passage to introduce external gas to the intake passage. The intake passage includes a bent portion, which is separate from the compressor and is located at a position that is adjacent to the compressor and is upstream of the compressor in a direction of intake air flow. A curvature of the bent portion in an extending direction of the intake passage is greater than curvatures of portions of the intake passage upstream and downstream of the bent portion in the direction of the intake air flow. When, in a direction in which a rotational axis of the compressor wheel extends, a direction away from the compressor wheel is defined as a positive direction and a direction toward the compressor wheel is defined as a negative direction, an upstream section of the bent portion in the direction of the intake air flow extends in a form in which intake air flows in a direction including a positive direction component and a downstream section of the bent portion in the direction of the intake air flow extends in a form in which intake air flows in a direction including a negative direction component. The introduction passage is connected to a part of the bent portion that is on an inner side in a bending direction, wherein, if an imaginary line perpendicular to the rotational axis and tangent to an inner surface of the inner side section is drawn, the connected part is located at a contact point where the imaginary line contacts the inner surface.

In the internal combustion engine, the internal pressure of a part of the intake passage upstream of the compressor in the direction of the intake air flow (hereinafter, simply referred to as upstream) never becomes a positive pressure (a pressure greater than the atmospheric pressure) due to forced induction performed by the forced induction device. However, it is difficult to make the internal pressure become a negative pressure (a pressure lower than the atmospheric pressure), in other words, a low pressure that allows a sufficient amount of external gas to be introduced to the intake passage using the internal pressure. Thus, if the introduction passage for introducing the external gas is simply connected to a part of the intake passage upstream of the compressor, the introduction passage, which introduces external gas into the intake passage using the internal pressure of the intake passage, has a limit in increasing the introduction efficiency of external gas through the introduction passage.

According to the above described internal combustion engine, the bent portion, the curvature of which in the extending direction is greater than the curvature at the upstream portion and the downstream portion in the direction of the intake air flow (hereinafter, simply referred to as downstream), is formed in the intake passage. Thus, the flow velocity of intake air is uneven at the bent portion and the surrounding parts in the intake passage and the pressure becomes uneven in the intake passage. That is, at the inner side section of the bent portion in the bending direction is formed a section where the flow velocity of the intake air is higher and the internal pressure is lower than the section upstream of the bent portion and the section downstream of the bent portion in the direction of the intake air flow (hereinafter, simply referred to as downstream). The internal pressure of the inner side section of the bent portion is lower than the internal pressure of the intake passage in a case in which the bent portion is not formed and the pressure is not uneven.

According to the above described internal combustion engine, since the introduction passage is connected to the inner side section of the bent portion in the bending direction, that is, the section where the internal pressure is low, the external gas is drawn into the intake passage using the internal pressure of the intake passage, and the external gas is efficiently introduced into the intake passage. Thus, the external gas is introduced into the intake passage during forced induction with a simple structure without additionally providing a special device other than the introduction passage.

In the above described internal combustion engine, the bent portion is preferably formed at a position adjacent to the compressor in the intake passage.

In the above described internal combustion engine, the intake passage preferably includes an upstream passage, which configures a part of the intake passage upstream of the compressor in the direction of the intake air flow, and the upstream passage preferably includes a joint portion, which is connected to the compressor, at a downstream end in the direction of the intake air flow and the bent portion at a position adjacent to the joint portion.

During forced induction performed by the forced induction device, the pressure is reduced in the vicinity of the inlet of the compressor as the compressor draws in air. According to the above described internal combustion engine, the bent portion is formed at a position close to the inlet of the compressor. Thus, the factor that reduces the internal pressure of a part of the intake passage to which the introduction passage is connected includes the reduction of the internal pressure in the vicinity of the inlet of the compressor in addition to the reduction of the internal pressure by forming the bent portion. As a result, as compared to an internal combustion engine in which the introduction passage is connected to a bent portion formed at a position greatly separate from the compressor, the internal pressure of a part of the intake passage to which the introduction passage is connected is reduced. This allows the external gas to be favorably introduced into the intake passage through the introduction passage.

In the above described internal combustion engine, the bent portion is configured to form an area where a flow velocity of intake air is higher than that in surrounding parts at an interior of the part of the bent portion on the inner side in the bending direction.

In the above described internal combustion engine, the bent portion is configured to form an area where a pressure is lower than that in the surrounding parts at an interior of the part of the bent portion on the inner side in the bending direction.

According to such an internal combustion engine, the internal pressure at the inner side section of the bent portion in the bending direction is reduced as compared to the surrounding parts, that is, the outer section in the bending direction, the section upstream of the bent portion, and the section downstream of the bent portion.

The internal combustion engine may be configured to introduce the external gas into the intake passage by using a difference between an internal pressure of a part of the bent portion to which the introduction passage is connected and an internal pressure of a part of the introduction passage into which the external gas flows.

According to the above described internal combustion engine, since the internal pressure of the inner side section of the bent portion in the bending direction is reduced, the difference between the internal pressure at the section of the bent portion to which the introduction passage is connected and the internal pressure of the section of the introduction passage into which the external gas flows is increased as compared to a case without the bent portion. Thus, the external gas is favorably introduced into the intake passage using the difference between the internal pressures.

The internal combustion engine may include a fuel tank that stores fuel and a canister that adsorbs fuel vapor generated in the fuel tank. In this case, the introduction passage connects the intake passage to the canister, and the external gas is purge gas including the fuel vapor.

In the above described internal combustion engine, the bent portion has a circular cross-sectional shape, and a radius of curvature of the bent portion in the extending direction of the intake passage is less than or equal to an inner diameter of the bent portion.

The inventor has found that forming the bent portion as described above makes the section where the pressure is adequately lower than the surrounding parts in the bent portion of the intake passage. According to the above described internal combustion engine, since the relationship between the radius of curvature of the bent portion and the inner diameter is specified as described above, the section where the internal pressure is low is formed at the inner side section of the bent portion in the bending direction in a suitable manner.

The internal combustion engine may include a first introduction passage, which is connected to a part of the intake passage downstream of the compressor in the direction of the intake air flow for introducing the external gas to this part, and a second introduction passage, which is connected to a part of the intake passage upstream of the compressor in the direction of the intake air flow to introduce the external gas to this part. The introduction passage connected to the part on the inner side may be the second introduction passage, and the curvature of the bent portion in the extending direction of the intake passage may be greater than a curvature of a part of the intake passage to which the first introduction passage is connected.

In the above described internal combustion engine, at a part of the intake passage upstream of the compressor is formed the bent portion the curvature of which in the extending direction is greater than that of a part of the intake passage downstream of the compressor (more specifically, the part to which the first introduction passage is connected). Thus, the flow velocity of the intake air is uneven in the bent portion and the surrounding parts in the intake passage and the pressure is uneven in the intake passage.

According to the above described internal combustion engine, since the second introduction passage is connected to the inner side section of the bent portion in the bending direction, that is, the section where the internal pressure is low, external gas is drawn into the section of the intake passage upstream of the compressor using the internal pressure, and the external gas is efficiently introduced to this section.

MODES FOR CARRYING OUT THE INVENTION

An internal combustion engine with a forced induction device according to one embodiment will now be described.

Figure 1:
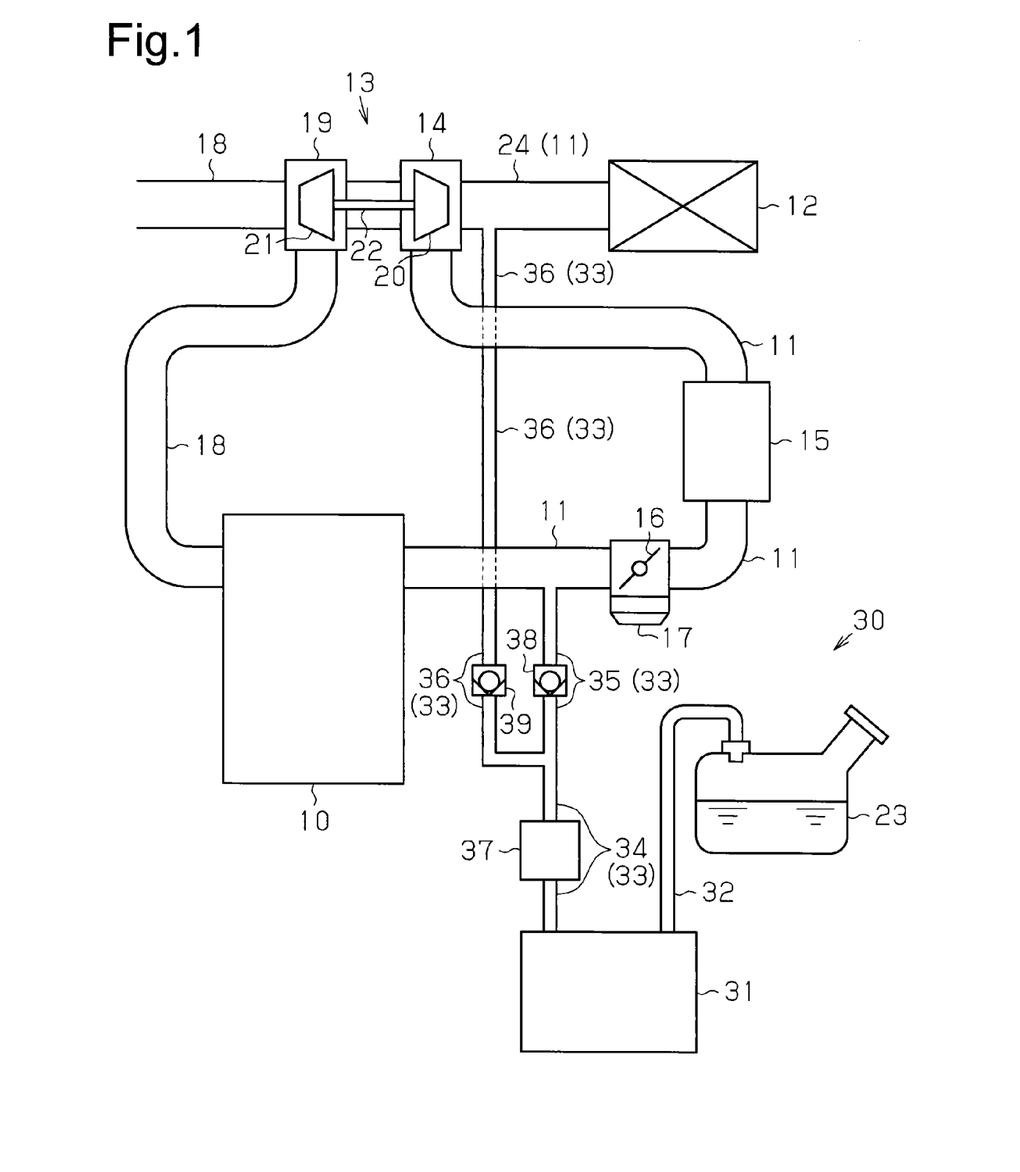
FIG. 1 is a block diagram illustrating a schematic configuration of an internal combustion engine with a forced induction device according to one embodiment.

As shown in FIG. 1, an internal combustion engine 10 has an intake passage 11 that includes, in order from the upstream end in the direction of intake air flow (hereinafter, simply referred to as upstream), an air cleaner 12, which filters intake air, a compressor 14 of a forced induction device 13, an intercooler 15, which cools the intake air by heat exchange with external air, and a throttle valve 16.

A throttle motor 17 drives the throttle valve 16 to control the opening degree of the throttle valve 16. Controlling the opening degree of the throttle valve 16 varies the passage cross-sectional area of the intake passage 11 and thus regulates the amount of air drawn into the cylinders of the internal combustion engine 10.

The forced induction device 13 includes the compressor 14 and a turbine 19, which is provided in an exhaust passage 18 of the internal combustion engine 10. In the forced induction device 13, a compressor wheel 20, which is arranged inside the compressor 14, and a turbine wheel 21, which is arranged inside the turbine 19, are coupled by a shaft 22 to be integrally rotational. When the internal combustion engine 10 is operated and blows exhaust gas on the turbine wheel 21, the turbine wheel 21 and the compressor wheel 20 rotate integrally. This causes the intake air flowing through the intake passage 11 to be transferred and forced into the cylinders of the internal combustion engine 10.

The internal combustion engine 10 includes a fuel vapor processing system 30. The fuel vapor processing system 30 includes a fuel tank 23, which stores fuel, a canister 31, which adsorbs and stores fuel vapor (gas-phase fuel) generated in the fuel tank 23, a vapor passage 32, which connects the fuel tank 23 to the canister 31, and an introduction passage 33, which connects the intake passage 11 of the internal combustion engine 10 to the canister 31.

The fuel vapor generated in the fuel tank 23 is delivered to the canister 31 through the vapor passage 32. The canister 31 includes an adsorbing member located inside the canister 31 and temporarily stores the fuel vapor from the fuel tank 23 by condensing the fuel vapor into liquid-phase fuel and adsorbing it with the adsorbing member. The canister 31 is configured to be capable of separating fuel that has been adsorbed by the adsorbing member.

Furthermore, the introduction passage 33 includes a base passage 34, which has a first end connected to the canister 31, and two branched passages, which are connected to a second end of the base passage 34. One of the branched passages, that is, a first purge passage 35 is connected to a part of the intake passage 11 downstream of the throttle valve 16 in the flow direction of the intake air (hereinafter, simply referred to as downstream), and the other one of the branched passages, that is, a second purge passage 36 is connected to a part of the intake passage 11 upstream of the compressor 14. In the present embodiment, a passage configured by the base passage 34 and the first purge passage 35 functions as a first introduction passage, and a passage configured by the base passage 34 and the second purge passage 36 functions as a second introduction passage.

The base passage 34 is provided with a purge control valve 37, which varies the passage cross-sectional area. The first purge passage 35 is provided with a first check valve 38, and the second purge passage 36 is provided with a second check valve 39. The first and second purge passages 35, 36 each include a first section extending from the corresponding check valve 38 or 39 to the intake passage 11 and a second section extending from the corresponding check valve 38 or 39 to the base passage 34. The check valves 38, 39 both open when the pressure of the first section (pressure of the intake passage 11) is less than the pressure of the second section (pressure of the base passage 34) to permit purge gas (gas including fuel vapor) to flow into the intake passage 11 from the canister 31, and the check valves 38, 39 both close when the pressure of the first section (pressure of the intake passage 11) is greater than or equal to the pressure of the second section (pressure of the base passage 34) to restrict the flow of intake air from the intake passage 11 into the fuel vapor processing system 30. Furthermore, closing at least one of the check valves 38, 39 blocks communication between a part of the intake passage 11 upstream of the compressor 14 and a part of the intake passage 11 downstream of the throttle valve 16 via the first purge passage 35 and the second purge passage 36 and prohibits the flow of intake air through the first purge passage 35 and the second purge passage 36.

The fuel vapor processing system 30 functions as follows.

The fuel vapor processing system 30 transfers fuel vapor generated in the fuel tank 23 to the canister 31 through the vapor passage 32 and adsorbs the fuel vapor by the adsorbing member of the canister 31. The purge control valve 37 is opened to introduce the purge gas from the inside of the canister 31 to the intake passage 11.

When the purge control valve 37 is opened, the purge gas is introduced to the intake passage 11 as follows in a case in which forced induction is not being performed by the forced induction device 13 and the opening degree of the throttle valve 16 is small.

While receiving pressure in a section of the intake passage 11 downstream of the throttle valve 16 (more specifically, pressure less than the atmospheric pressure [intake negative pressure]) through the first section of the first purge passage 35, the first check valve 38 receives relatively high pressure (≈atmospheric pressure) in the canister 31 through the second section of the first purge passage 35. Thus, first check valve 38 is opened. This produces a flow of gas inside the fuel vapor processing system 30 from the canister 31 through the base passage 34 and the first purge passage 35 to the intake passage 11. The flow causes the fuel adsorbed in the adsorbing member of the canister 31 to be separated as fuel vapor and to be discharged to the intake passage 11 through the introduction passage 33.

At this time, the second check valve 39 is closed because while receiving the intake negative pressure via the first purge passage 35 and the second section of the second purge passage 36, the second check valve 39 receives pressure in a section of the intake passage 11 upstream of the compressor 14 (hereinafter, referred to as the upstream pressure [upstream pressure>intake negative pressure]) via the first section of the second purge passage 36. Thus, the intake air is prohibited from flowing to the first purge passage 35 and a part of the intake passage 11 downstream of the throttle valve 16 via the second purge passage 36.

In a case in which forced induction is performed by the forced induction device 13 when the purge control valve 37 is opened to introduce the purge gas to the intake passage 11, the purge gas is introduced to the intake passage 11 as follows.

While receiving pressure in a section of the intake passage 11 downstream of the throttle valve 16 (more specifically, pressure higher than the atmospheric pressure, hereinafter, referred to as forced induction pressure) through the first section of the first purge passage 35, the first check valve 38 receives pressure inside the canister 31 through the second section of the first purge passage 35. Thus, when the forced induction pressure is higher than the internal pressure of the canister 31 due to forced induction performed by the forced induction device 13, the first check valve 38 is closed. This inhibits the high-pressure intake air at a part of the intake passage 11 downstream of the throttle valve 16 from flowing to the interior of the fuel vapor processing system 30.

Furthermore, the second check valve 39 at this time receives the upstream pressure of the intake passage 11 through the first section of the second purge passage 36 and receives the internal pressure of the canister 31 through the second section of the second purge passage 36. Thus, when the upstream pressure of the intake passage 11 is lower than the internal pressure of the canister 31, the second check valve 39 is opened. At this time, the flow of gas is formed inside the fuel vapor processing system 30 from the canister 31 through the base passage 34 and the second purge passage 36 to the intake passage 11. The flow causes the fuel adsorbed by the adsorbing member of the canister 31 to be separated as fuel vapor and to be discharged to the intake passage 11.

As described above, the internal combustion engine 10 introduces the purge gas to the interior of the intake passage 11 using the difference between the internal pressure of the part of the intake passage 11 to which the introduction passage 33 is connected and the internal pressure of the part of the introduction passage 33 into which the purge gas flows (more specifically, the canister 31). Since the first check valve 38 and the second check valve 39 operate in accordance with the pressure in parts of the fuel vapor processing system 30, the check valves 38, 39 may both be closed or may both be opened for a short period of time depending on the operating condition of the internal combustion engine 10.

In the internal combustion engine 10, since the internal pressure of the part of the intake passage 11 downstream of the compressor 14 is basically increased when the forced induction device 13 performs forced induction, the purge gas cannot be introduced to the intake passage 11 through the first purge passage 35 and the first check valve 38.

Furthermore, in the internal combustion engine 10, the internal pressure of the part of the intake passage 11 upstream of the compressor 14 (the upstream pressure) never becomes a positive pressure (pressure higher than atmospheric pressure) by forced induction of the forced induction device 13. However, it is difficult to make the upstream pressure become a negative pressure (pressure lower than the atmospheric pressure). In other words, it is difficult to make the upstream pressure become a low pressure that allows a sufficient amount of purge gas to be introduced to the intake passage 11 using the upstream pressure. Thus, if the second purge passage 36 is simply connected to the part of the intake passage 11 upstream of the compressor 14, the second purge passage 36, which introduces the purge gas into the intake passage 11 using the upstream pressure, has a limit in increasing the introduction efficiency of the purge gas through the second purge passage 36.

Figure 2:
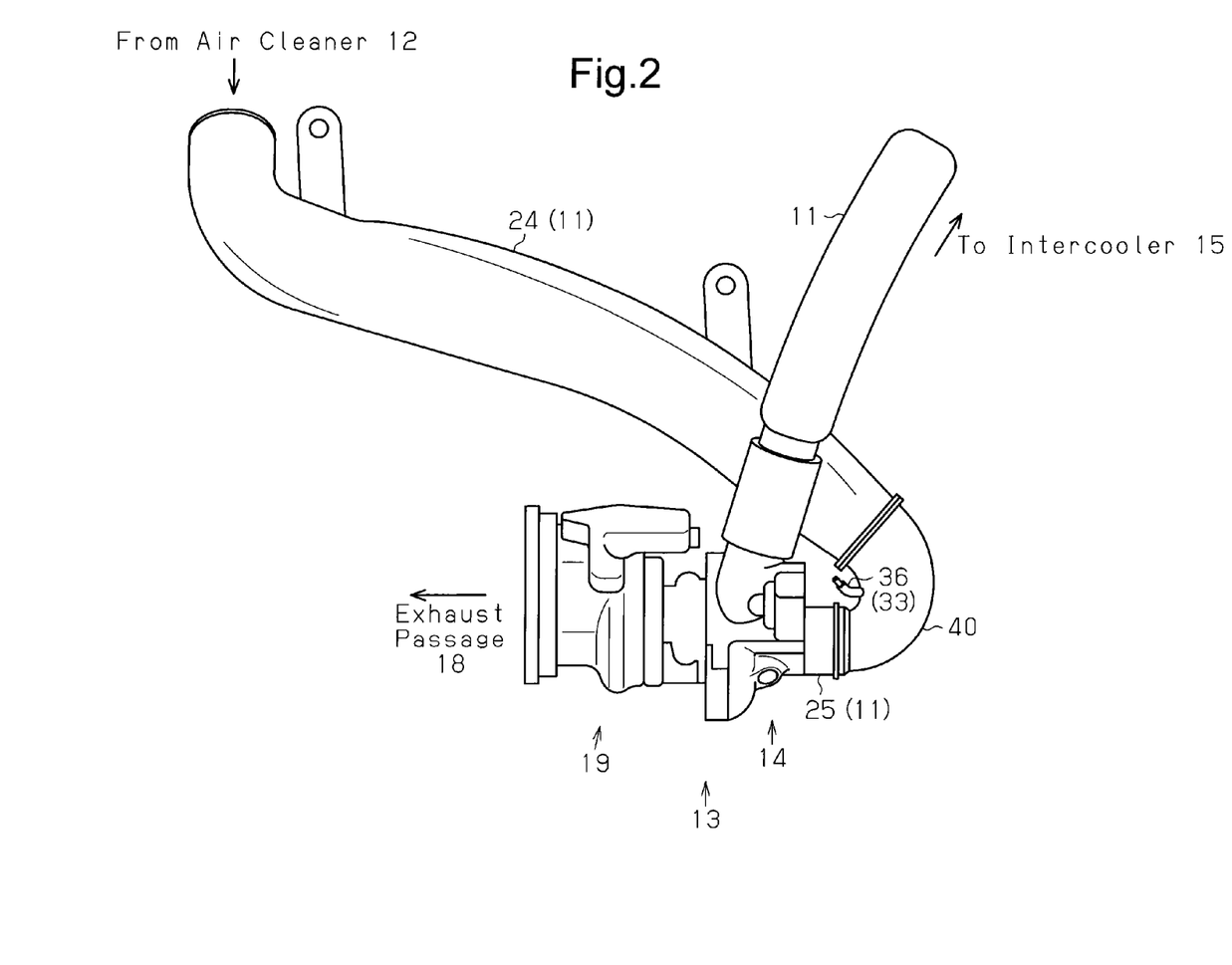
FIG. 2 is a diagram showing the manner in which an intake passage extends at a bent portion and around the bent portion.
Figure 3:
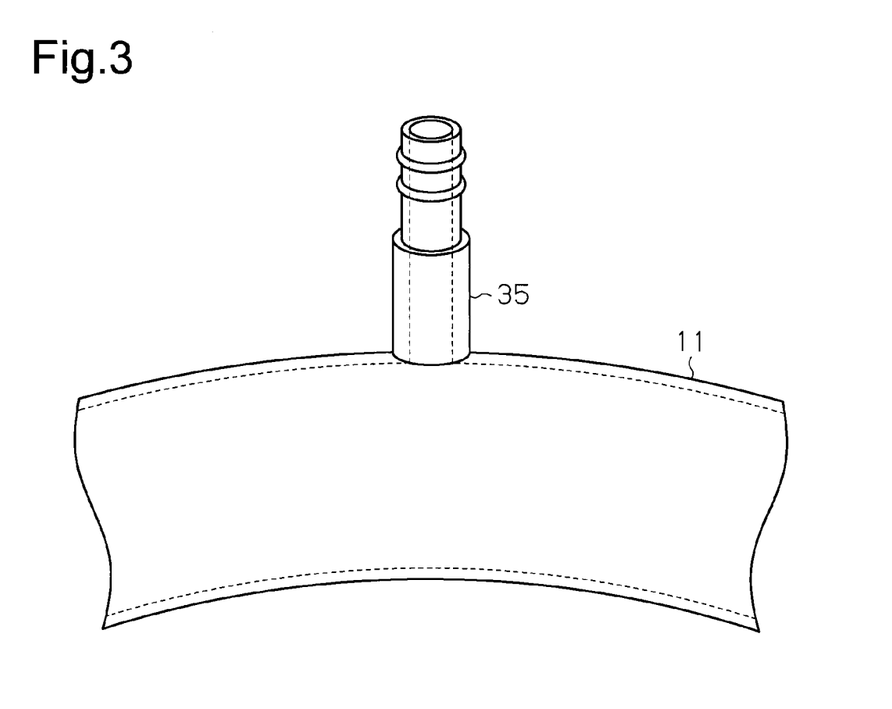
FIG. 3 is a diagram showing the manner in which an intake passage extends at a joint portion to which a second purge passage is coupled and around the joint portion.

In view of the above, as shown in FIG. 2, the present embodiment has a bent portion 40 formed at a position in the intake passage 11 upstream of the compressor 14. The curvature of the bent portion 40 in the extending direction of the intake passage 11 is greater than that at the section upstream of the bent portion 40 and the section downstream of the bent portion 40. The bent portion 40 is shaped to curve into a substantially arcuate form in one direction. The second purge passage 36 is connected to an inner side section of the bent portion 40 in the bending direction. As shown in FIG. 2 or 3, the curvature of the bent portion 40 (FIG. 2) in the extending direction is greater than the curvature of the part of the intake passage 11 to which the first purge passage 35 (FIG. 3) is connected in the extending direction.

Operation of the bent portion 40 formed in the intake passage 11 will be discussed below.

Figure 4:
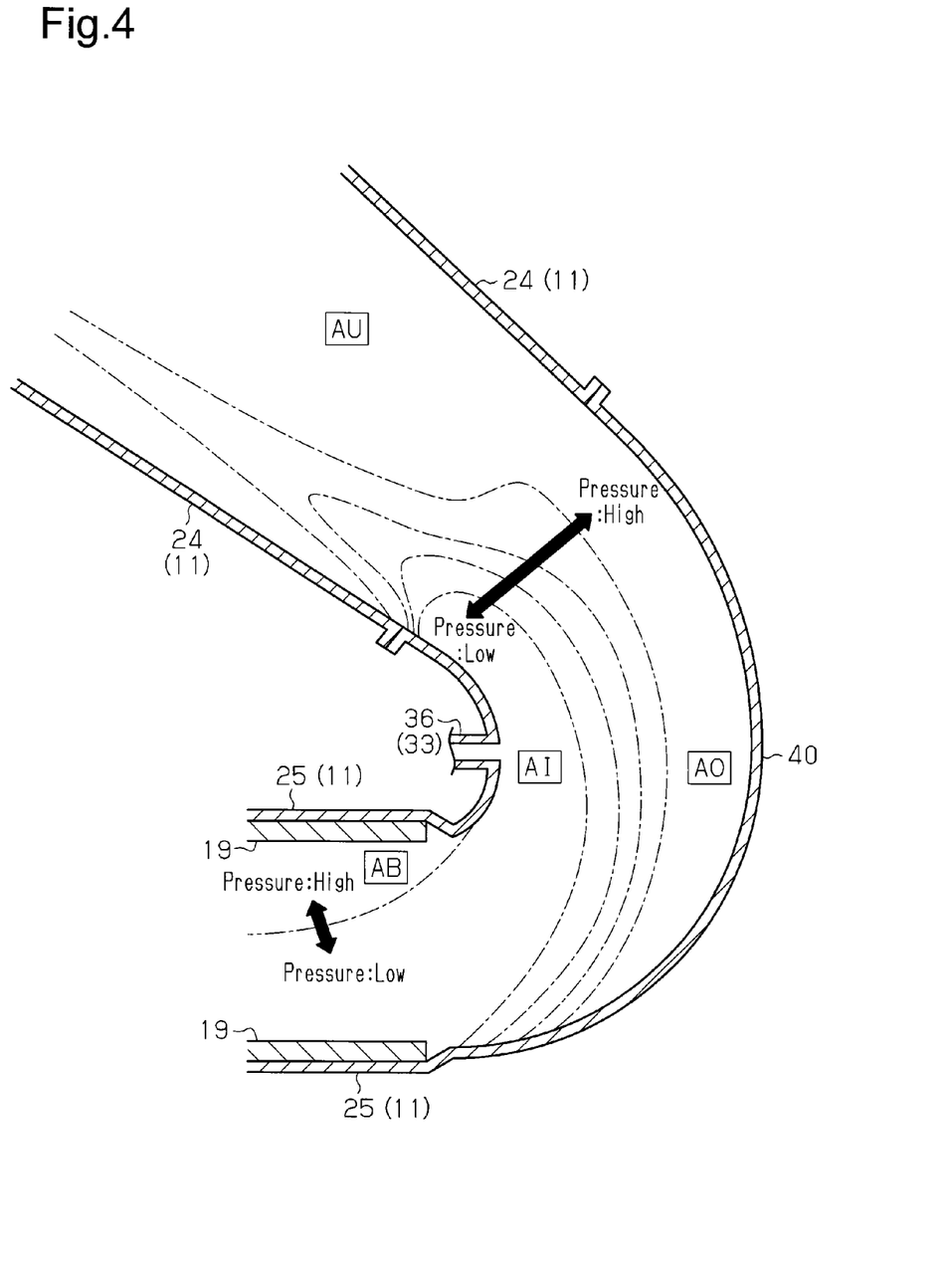
FIG. 4 is a cross-sectional view of the bent portion and the surrounding parts, showing the cross-sectional structure together with a flow velocity distribution of intake air.

FIG. 4 shows an example of flow velocity distribution of intake air in the bent portion 40 and the surrounding parts inside the intake passage 11. The long dashed short dashed lines in FIG. 4 are isotachs.

As shown in FIG. 4, forming the bent portion 40 in the intake passage 11 causes the flow velocity of the intake air to be uneven in the bent portion 40 and the surrounding parts in the intake passage 11 and causes the pressure to be uneven inside the intake passage 11. More specifically, at an inner side section AI in the bending direction of the bent portion 40, an area is formed where the flow velocity of the intake air is higher and the internal pressure is lower than those of an outer section AO in the bending direction, an upstream section AU located upstream of the bent portion 40, and a downstream section AB located downstream of the bent portion 40. In the inner side section AI, the pressure is further reduced due to increased pressure loss arising from, for example, swirling current caused in the vicinity of the inner wall surface of the intake passage 11 and intake air flow separation caused by the swirling current because of high flow velocity of the intake air. Also, the internal pressure at the inner side section AI of the bent portion 40 is lower than the internal pressure of the intake passage 11 in a case in which the bent portion 40 is not formed and the pressure does not vary.

As described above, the internal combustion engine 10 (FIG. 1) introduces the purge gas into the intake passage 11 using the difference between the internal pressure of the part of the intake passage 11 to which the second purge passage 36 is connected (more specifically, the inner side section of the bent portion 40 in the bending direction) and the internal pressure of the part of the second purge passage 36 into which the purge gas flows (more specifically, the canister 31).

In the internal combustion engine 10 of the preferred embodiment, since the second purge passage 36 is connected to the inner side section of the bent portion 40 in the bending direction, that is, the section where the internal pressure is low, the internal pressure of a part of the intake passage 11 where the second purge passage 36 is connected is set to a low pressure that allows a sufficient amount of purge gas to be introduced to the intake passage 11. Thus, the difference between the internal pressures is increased, and the purge gas is efficiently introduced to the interior of the intake passage 11 using the internal pressure of the intake passage 11. As a result, the purge gas is introduced into the intake passage 11 during forced induction with a simple structure without additionally providing a special device (for example, an ejector) other than the second purge passage 36 and the second check valve 39.

Furthermore, in the internal combustion engine 10 of the preferred embodiment, the bent portion 40 is formed at a position adjacent to the compressor 14 in the intake passage 11 as shown in FIG. 2. More specifically, a part of the intake passage 11 is configured by a passage that is connected to the compressor 14 and forms the part upstream of the compressor 14, that is, a passage (upstream passage 24) that connects the compressor 14 to the air cleaner 12. A cylindrical joint portion 25, which is connected to the compressor 14, is formed at the downstream end of the upstream passage 24. The bent portion 40 is formed at a position adjacent to the joint portion 25.

During forced induction performed by the forced induction device 13, the pressure is reduced in the vicinity of the inlet of the compressor 14 in accordance with intake of air by the compressor 14. The internal combustion engine 10 has the bent portion 40 formed at a position close to the inlet of the compressor 14. Thus, the factor that reduces the internal pressure of a part of the intake passage 11 to which the second purge passage 36 is connected includes the reduction of the internal pressure in the vicinity of the inlet of the compressor 14 in addition to the reduction of the internal pressure by forming the bent portion 40. Thus, the internal pressure of a part of the intake passage 11 to which the second purge passage 36 is connected, that is, the inner side section of the bent portion 40 in the bending direction is further reduced. As a result, as compared to an internal combustion engine in which the second purge passage is connected to a bent portion formed at a position greatly separate from the compressor, the difference between the internal pressure of the inner side section of the bent portion 40 in the bending direction and the internal pressure of the canister 31 is increased. This allows the purge gas to be favorably introduced into the intake passage 11 through the second purge passage 36.

As shown in FIG. 4, the passage cross-sectional area of the downstream portion of the upstream passage 24 is gradually reduced toward the joint portion 25. Thus, the downstream portion of the upstream passage 24 is the narrowest in the vicinity of the joint portion 25. In the internal combustion engine 10, since the bent portion 40 is formed at such a position, the bent portion 40 is formed at a portion where the flow velocity of the intake air is particularly high among parts of the intake passage 11 upstream of the compressor 14. This favorably increases the flow velocity of the intake air at the inner side section of the bent portion 40 in the bending direction.

The shape of the bent portion 40 will be described in detail below.

Figure 5:
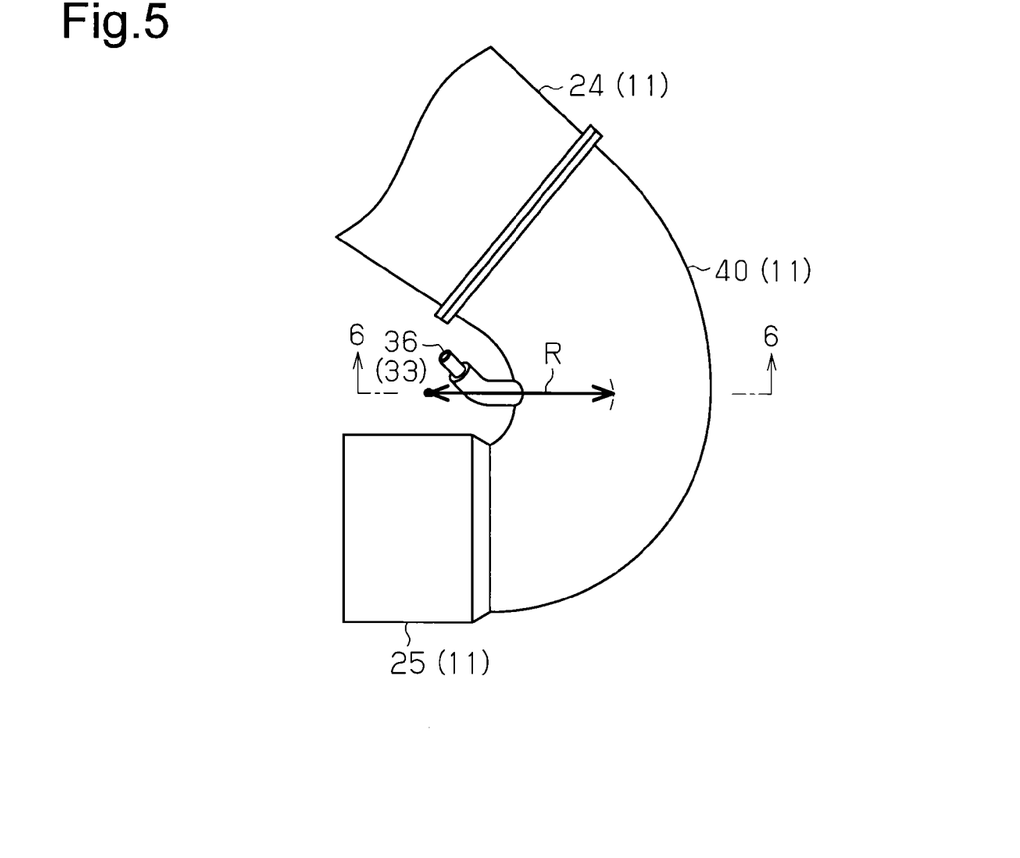
FIG. 5 is a side view of the bent portion and the surrounding parts showing the side structure.
Figure 6:
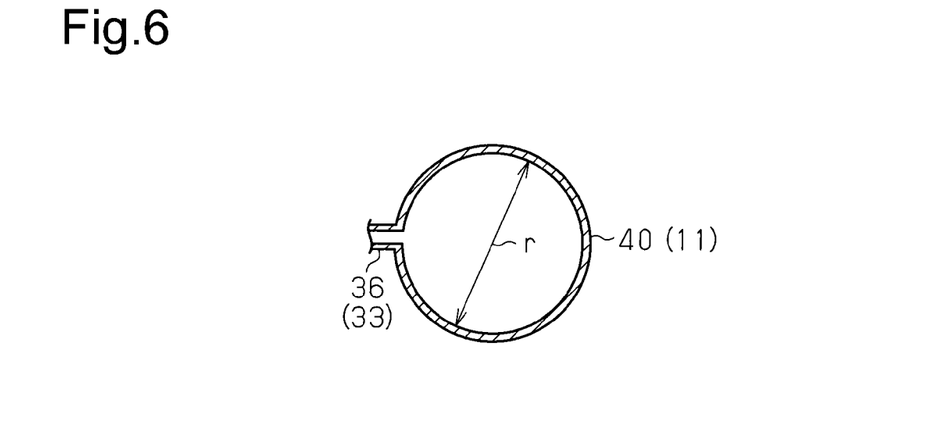
FIG. 6 is a cross-sectional view taken along line 6-6 of FIG. 5, showing the cross-sectional structure.

As shown in FIGS. 5 and 6, the bent portion 40 is formed such that the cross-sectional shape of parts of the bent portion 40 is circular and that the radius of curvature R in the extending direction and the internal diameter (inner diameter r) are equal to each other at each part. Thus, the bent portion 40 is formed such that the radius of curvature R and the inner diameter r gradually reduce toward the downstream end.

The present embodiment requires the shape of the passage to satisfy the following [Condition 1] and [Condition 2], and this shape is set as the shape of the bent portion 40 of the intake passage 11.

[Condition 1] a shape that ensures the intake air amount that is required to obtain the maximum output during operation of the internal combustion engine 10.

[Condition 2] a shape that ensures the flow rate of purge gas conducted to the intake passage 11 that is required to inhibit leakage of fuel vapor to the atmosphere during operation of the internal combustion engine 10.

As a result of various experiments and simulations, the present inventor has found that the internal combustion engine 10 in which the cross-sectional shape of the bent portion 40 is circular satisfies both [Condition 1] and [Condition 2] by setting the radius of curvature R of the bent portion 40 in the extending direction to be less than or equal to the inner diameter r of the bent portion 40. However, if the radius of curvature R of the bent portion 40 is too small, the pressure loss at the interior of the bent portion 40 may possibly become excessively high. Thus, in the present embodiment, the bent portion 40 is formed such that the radius of curvature R in the extending direction and the inner diameter r are equal to each other at each part. Thus, while keeping the pressure loss that occurs inside the bent portion 40 to be small, pressure that is adequately lower than the surrounding parts is generated in the inner side section of the bent portion 40 in the bending direction.

The above illustrated embodiment achieves the following advantages.

(1) The bent portion 40 is provided at a position in the intake passage 11 upstream of the compressor 14. The curvature of the bent portion 40 of the intake passage 11 in the extending direction is greater than that at portions upstream and downstream of the bent portion 40. The second purge passage 36 is connected to the inner side section of the bent portion 40 in the bending direction. Thus, the purge gas is introduced into the intake passage 11 during forced induction with a simple structure without additionally providing a special device other than the second purge passage 36 and the second check valve 39.

(2) The bent portion 40 is formed at a position in the intake passage 11 adjacent to the compressor 14. Thus, as compared to an internal combustion engine in which the second purge passage is connected to a bent portion formed at a position greatly separate from the compressor, the difference between the internal pressure at the inner side section of the bent portion 40 in the bending direction and the internal pressure of the canister 31 is increased. This allows the purge gas to be favorably introduced into the intake passage 11 through the second purge passage 36.

(3) The internal combustion engine 10 is configured to introduce purge gas into the intake passage 11 by using the difference between the internal pressure at a part of the intake passage 11 to which the second purge passage 36 is connected and the internal pressure of a part of the second purge passage 36 into which the purge gas flows. Thus, the difference between the internal pressures is great, and the purge gas is efficiently introduced into the intake passage 11 using the internal pressure of the intake passage 11.

(4) The bent portion 40 is formed such that the cross-sectional shape of parts of the bent portion 40 is circular, and the radius of curvature R in the extending direction and the inner diameter r are equal to each other at each part. Thus, an adequately low pressure is generated in the inner side section of the bent portion 40 in the bending direction as compared to the surrounding parts.

(5) The curvature of the bent portion 40 of the intake passage 11 in the extending direction is greater than the curvature of the part of the intake passage 11 at which the first purge passage 35 is connected in the extending direction. Thus, the purge gas is introduced into the intake passage 11 during forced induction with a simple structure without additionally providing a special device other than the second purge passage 36 and the second check valve 39.

The above illustrated embodiment may be modified as follows.

In the above-described embodiment, the shape of parts of the bent portion 40 is formed such that the radius of curvature R in the extending direction and the inner diameter r are equal to each other. Instead, the shape of a part of the bent portion or the entire bent portion may be formed such that the radius of curvature R of the bent portion in the extending direction is smaller than the inner diameter r of the bent portion. Such an internal combustion engine can also adequately reduce the internal pressure of the inner side section of the bent portion in the bending direction.

The cross-sectional shape of the bent portion 40 may be other than a circular shape. In this case, the equivalent diameter of the cross-sectional shape of the bent portion is obtained, and the obtained equivalent diameter is used to determine the shape of the bent portion instead of the inner diameter r of the bent portion. Furthermore, the radius of curvature of the bent portion may be obtained based on a line connecting the center of gravity of the passage cross-sectional shape of the bent portion, and the shape of the bent portion may be determined based on the obtained radius of curvature.

The above-described embodiment may be applied to any internal combustion engine that introduces external gas into the intake passage using the internal pressure of the intake passage instead of the internal combustion engine 10, which includes the fuel vapor processing system 30. For example, the above-described embodiment may be modified as required and applied to an internal combustion engine that includes a blow-by gas processing device, which introduces blow-by gas stored in the crank case into the intake passage and processes it. In the case of the internal combustion engine that includes the blow-by gas processing device, the blow-by gas functions as the external gas, a passage connecting the crank case and a part of the intake passage downstream of the compressor functions as a first introduction passage, and a passage connecting the crank case to a part of the intake passage upstream of the compressor functions as a second introduction passage. In this case, at a position in the intake passage upstream of the compressor, a bent portion may be formed the curvature of which in the extending direction is greater than the curvatures at portions upstream and downstream of the bent portion (or the part of the intake passage to which the first introduction passage is connected). In addition, the second introduction passage may be connected to the inner side section of the bent portion in the bending direction.

In the internal combustion engine 10 of the above-described embodiment, the bent portion 40 is formed at a part of the intake passage 11 upstream of the compressor 14, and the introduction passage is connected to the inner side section of the bent portion 40 in the bending direction in order to efficiently introduce the external gas into the intake passage 11 during forced induction. Such a structure may also be applied to an internal combustion engine that does not include the first introduction passage for introducing the external gas to a part of the intake passage 11 downstream of the compressor 14.

The above-described embodiment may be modified as required and applied to an internal combustion engine that includes a forced induction device driven by an engine output shaft instead of the internal combustion engine that includes the forced induction device driven by the exhaust gas.

DESCRIPTION OF THE REFERENCE NUMERALS

10 . . . Internal Combustion Engine, 11 . . . Intake Passage, 12 . . . Air Cleaner, 13 . . . Forced Induction Device, 14 . . . Compressor, 15 . . . Intercooler, 16 . . . Throttle Valve, 17 . . . Throttle Motor, 18 . . . Exhaust Passage, 19 . . . Turbine, 20 . . . Compressor Wheel, 21 . . . Turbine Wheel, 22 . . . Shaft, 23 . . . Fuel Tank, 24 . . . Upstream Passage, 25 . . . Joint Portion, 30 . . . Fuel Vapor Processing System, 31 . . . Canister, 32 . . . Vapor Passage, 33 . . . Introduction Passage, 34 . . . Base Passage, 35 . . . First Purge Passage, 36 . . . Second Purge Passage, 37 . . . Purge Control Valve, 38 . . . First Check Valve, 39 . . . Second Check Valve, 40 . . . Bent portion.

The invention claimed is:

1. An internal combustion engine with a forced induction device, comprising:

a forced induction device, which includes a compressor arranged in an intake passage, the compressor including a compressor wheel arranged inside the compressor; and an introduction passage, which is connected to the intake passage to introduce external gas to the intake passage, wherein the intake passage includes a bent portion, which is a component separate from the compressor and is located at a position that is adjacent to the compressor and is upstream of the compressor in a direction of intake air flow, a curvature of the bent portion in an extending direction of the intake passage is greater than curvatures of portions of the intake passage upstream and downstream of the bent portion in the direction of the intake air flow, and when, in a direction in which a rotational axis of the compressor wheel extends, a direction toward the bent portion from the compressor wheel is defined as a positive direction and a direction toward the compressor wheel from the bent portion is defined as a negative direction, an upstream section of the bent portion in the direction of the intake air flow extends in a form in which intake air flows in a direction including a positive direction component and a downstream section of the bent portion in the direction of the intake air flow extends in a form in which intake air flows in a direction including a negative direction component, and the introduction passage is connected to a part of the bent portion that is on an inner side in a bending direction, wherein the introduction passage has an opening that opens in the intake passage and faces in the positive direction.

2. The internal combustion engine with a forced induction device according to claim 1, wherein the intake passage includes an upstream passage, which configures a part of the intake passage upstream of the compressor in the direction of the intake air flow, and the upstream passage includes a joint portion, which is connected to the compressor, at a downstream end in the direction of the intake air flow and the bent portion at a position adjacent to the joint portion.

3. The internal combustion engine with a forced induction device according to claim 1, wherein the bent portion is configured to form an area where a flow velocity of intake air is higher than that in surrounding parts at an interior of the part of the bent portion on the inner side in the bending direction.

4. The internal combustion engine with a forced induction device according to claim 1, wherein the bent portion is configured to form an area where a pressure is lower than that in the surrounding parts at an interior of the part of the bent portion on the inner side in the bending direction.

5. The internal combustion engine with a forced induction device according to claim 1, wherein the internal combustion engine is configured to introduce the external gas into the intake passage by using a difference between an internal pressure of a part of the bent portion to which the introduction passage is connected and an internal pressure of a part of the introduction passage into which the external gas flows.

6. The internal combustion engine with a forced induction device according to claim 1, wherein
the internal combustion engine includes a fuel tank that stores fuel and a canister that adsorbs fuel vapor generated in the fuel tank,
the introduction passage connects the intake passage to the canister, and
the external gas is purge gas including the fuel vapor.

7. The internal combustion engine with a forced induction device according to claim 1, wherein the bent portion has a circular cross-sectional shape, and a radius of curvature of the bent portion in the extending direction of the intake passage is less than or equal to an inner diameter of the bent portion.

8. The internal combustion engine with a forced induction device according to claim 1, wherein
the internal combustion engine includes a first introduction passage, which is connected to a part of the intake passage downstream of the compressor in the direction of the intake air flow for introducing the external gas to this part, and a second introduction passage, which is connected to a part of the intake passage upstream of the compressor in the direction of the intake air flow to introduce the external gas to this part,
the introduction passage connected to the part on the inner side is the second introduction passage, and
the curvature of the bent portion in the extending direction of the intake passage is greater than a curvature of a part of the intake passage to which the first introduction passage is connected.

9. The internal combustion engine with a forced induction device according to claim 1, wherein, if an imaginary line perpendicular to the rotational axis and tangent to an inner surface of the inner side section is drawn, the part of the bent portion to which the introduction passage is connected is located at a contact point where the imaginary line contacts the inner surface.

10. The internal combustion engine with a forced induction device according to claim 1, wherein the opening of the introduction passage faces in a direction intersecting the direction of the intake air flow in the introduction passage.

11. The internal combustion engine with a forced induction device according to claim 6, wherein the external gas from the canister is introduced into the bent portion in the positive direction.

* * * * *